(12) United States Patent
Zhou et al.

(10) Patent No.: US 11,648,633 B2
(45) Date of Patent: May 16, 2023

(54) MULTI-PURPOSE PRECISION MACHINE TOOL

(71) Applicant: ZHEJIANG SF OILLESS BEARING CO., LTD., Jiashan Zhejiang (CN)

(72) Inventors: Yinchun Zhou, Jiashan Zhejiang (CN); Zhilin Pu, Jiashan Zhejiang (CN); Liang Xue, Jiashan Zhejiang (CN); Genrong Cai, Jiashan Zhejiang (CN)

(73) Assignee: ZHEJIANG SF OILLESS BEARING CO., LTD., Jiashan Zhejiang (CN)

( * ) Notice: Subject to any disclaimer, the term of this patent is extended or adjusted under 35 U.S.C. 154(b) by 51 days.

(21) Appl. No.: 17/456,220

(22) Filed: Nov. 23, 2021

(65) Prior Publication Data

US 2022/0080541 A1    Mar. 17, 2022

Related U.S. Application Data

(63) Continuation of application No. PCT/CN2020/087154, filed on Apr. 27, 2020.

(30) Foreign Application Priority Data

May 23, 2019    (CN) .......................... 201910433155.7

(51) Int. Cl.
*B23P 23/02* (2006.01)
(52) U.S. Cl.
CPC .................................... *B23P 23/02* (2013.01)
(58) Field of Classification Search
CPC ...................................................... B23P 23/02
See application file for complete search history.

(56) References Cited

FOREIGN PATENT DOCUMENTS

| CN | 206764305 U | 12/2017 | |
|---|---|---|---|
| CN | 208178927 U | 12/2018 | |
| CN | 208880143 U | 5/2019 | |
| DE | 19723702 A1 | 12/1998 | |
| FR | 2631571 A1 | 11/1989 | |
| GB | 2181372 A | * 4/1987 | ............ B23Q 39/02 |

OTHER PUBLICATIONS

International Search Report in PCT International Application No. PCT/CN2020/087154 dated Jul. 31, 2020.

* cited by examiner

*Primary Examiner* — Jason L Vaughan
*Assistant Examiner* — Amanda Kreiling
(74) *Attorney, Agent, or Firm* — Greenberg Traurig, LLP

(57) ABSTRACT

A multi-purpose precision machine tool is provided, which has main structures including a machine tool body, and a first workpiece fixing mechanism, a second workpiece fixing mechanism, and a tool mechanism provided on the machine tool body. The first workpiece fixing mechanism and the second workpiece fixing mechanism respectively include an internally expanding clamp and a soft-jaw chuck for clamping a workpiece, so as to not only drive the workpiece to rotate, and but also drive the workpiece to perform horizontal and vertical linear displacement. Therefore, the internally expanding clamp can first clamp the workpiece to machine one end of the workpiece, and then the soft-jaw chuck clamps the other end of the workpiece to machine the other end of the workpiece.

6 Claims, 3 Drawing Sheets

MULTI-PURPOSE PRECISION MACHINE TOOL

CROSS REFERENCE TO RELATED APPLICATION

This patent application is a continuation Patent Application of PCT International Application No. PCT/CN2020/087154, filed on Apr. 27, 2020, which claims the benefit of and priority of Chinese Patent Application No. 201910433155.7 filed on May 23, 2019, the disclosure of which is incorporated by reference herein in its entirety as part of the present application.

TECHNICAL FIELD

The present disclosure relates to the technical field of precision machine tools, in particular to a multi-purpose precision machine tool.

BACKGROUND ART

Traditional and common numerically-controlled machine tools generally only have one main spindle and one auxiliary shaft perpendicular to the main spindle to realize slot milling or hole drilling. When processing complex workpieces, it is necessary to remove the workpieces for reversing or turning. Thus, the operation of removing and reloading the workpieces greatly limiting the machining accuracy.

The precision machining center with more than three power axes (usually referred to as five axes) can process complex workpieces and meet the requirements of a higher precision without reversing or turning the workpieces. However, the price of such a five-axis precision machining center is very expensive, which is at least several times the price of common numerically-controlled machine tools.

SUMMARY

In order to solve the above technical problems, the present disclosure provides a multi-purpose precision machine tool, which can process workpieces without disassembling the workpieces.

To achieve the above purpose, the present disclosure provides the following solution.

The present disclosure provides a multi-purpose precision machine tool, including a machine tool body, a first workpiece fixing mechanism, a second workpiece fixing mechanism and a tool mechanism, where the first workpiece fixing mechanism and the second workpiece fixing mechanism are provided on two distal ends of a top of the machine tool body, respectively; and the tool mechanism is provided in a middle section of the machine tool body.

Preferably, the first workpiece fixing mechanism includes a first transverse guide rail, a first longitudinal sliding table, a first horizontal spindle power head and a first clamp; the first transverse guide rail is fixedly provided on the machine tool body, the first longitudinal sliding table is slidably provided on the first transverse guide rail, the first horizontal spindle power head is provided on the first longitudinal sliding table, and the first clamp is provided on a power output end of the first horizontal spindle power head.

Preferably, the first clamp is an internally expanding clamp.

Preferably, the second workpiece fixing mechanism includes a second transverse guide rail, a second longitudinal sliding table, a second horizontal spindle power head and a second clamp; the second transverse guide rail is fixedly provided on the machine tool body, the second longitudinal sliding table is slidably provided on the second transverse guide rail, the second horizontal spindle power head is provided on the second longitudinal sliding table, and the second clamp is provided on a power output end of the second horizontal spindle power head.

Preferably, the second clamp is a soft-jaw chuck.

Preferably, the tool mechanism includes a platform, a bracket, a sliding table, a tool power head and a tool holder; the platform is fixedly provided in a middle section of the machine tool body, the bracket is provided on the platform, the sliding table is provided on the bracket, the tool power head is slidably provided on the sliding table, and the tool holder is provided on the platform.

Preferably, the tool power head is a vertically combined power head for drilling and milling.

Preferably, the tool power head is provided with an oil-groove milling cutter and multiple drill bits.

Preferably, a step-turning cutter, a surface-outer-corner-turning cutter and an inner-chamfer-turning cutter are installed on the tool holder.

Compared with the prior art, the present disclosure has the following technical effects.

The main structure of the multi-purpose precision machine tool in the present disclosure includes a machine tool body, and a first workpiece fixing mechanism, a second workpiece fixing mechanism, and a tool mechanism provided on the machine tool body. The first workpiece fixing mechanism and the second workpiece fixing mechanism respectively include an internally expanding clamp and a soft-jaw chuck for clamping a workpiece, so as to not only drive the workpiece to rotate, and but also drive the workpiece to perform horizontal and vertical linear displacement. Therefore, the internally expanding clamp can first clamp the workpiece to machine one end of the workpiece, and then the soft-jaw chuck clamps the other end of the workpiece to machine the other end of the workpiece. Therefore, the workpiece can be machined without being detached, and the multi-purpose machine tool in the present disclosure has a simple structure and has the higher workpiece clamping conversion efficiency and the machining efficiency.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

Reference signs in drawings: 1 machine tool body; 2 first transverse guide rail; 3 second transverse guide rail; 4 first longitudinal sliding table; 5 second longitudinal sliding table; 6 first horizontal spindle power head; 7 second horizontal spindle power head; 8 internally expanding clamp; 9 soft-jaw chuck; 10 platform; 11 bracket; 12 sliding table; 13 vertically combined power head for drilling and milling; 14 workpiece; 15 tool holder; 16 step-turning cutter; 17 surface-outer-corner-turning cutter; 18 inner-chamfer-turning cutter; 19 oil-groove milling cutter; 20 first drill bit; 21 second drill bit.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

Embodiment 1

Figure 1:
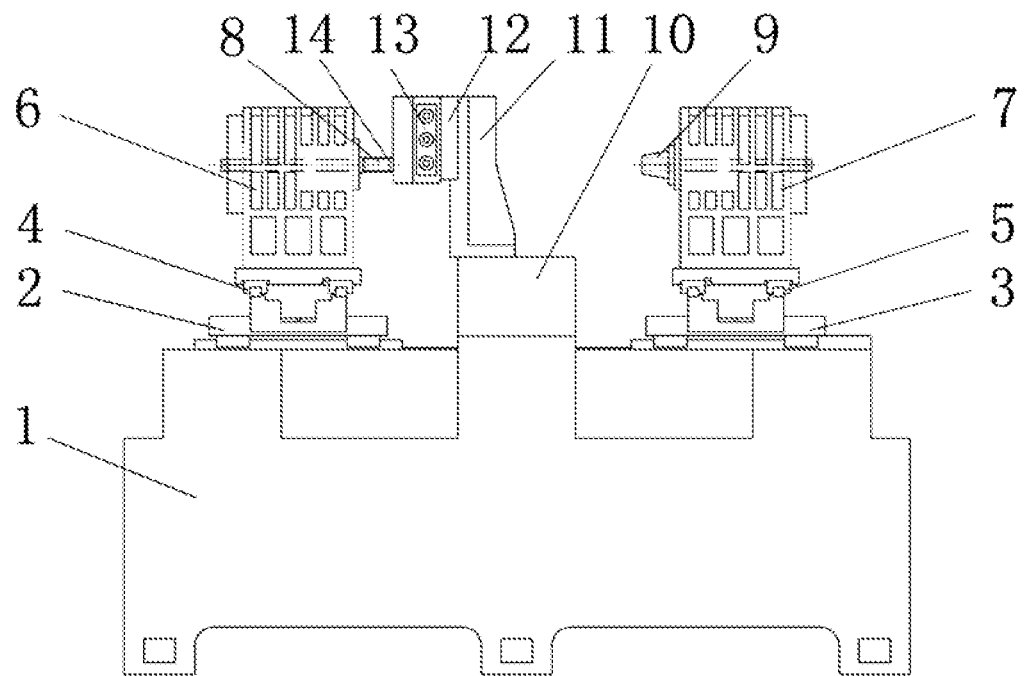
FIG. 1 is a schematic diagram of a front view structure of a multi-purpose precision machine tool according to an embodiment of the present disclosure.

As shown in FIG. 1, this embodiment provides a multi-purpose precision machine tool, including a machine tool body 1, a first workpiece fixing mechanism, a second workpiece fixing mechanism and a tool mechanism, where the first workpiece fixing mechanism and the second workpiece fixing mechanism are provided on two distal ends of the top of the machine tool body 1, respectively, and the tool mechanism is provided in the middle section of the machine tool body 1.

Figure 2:
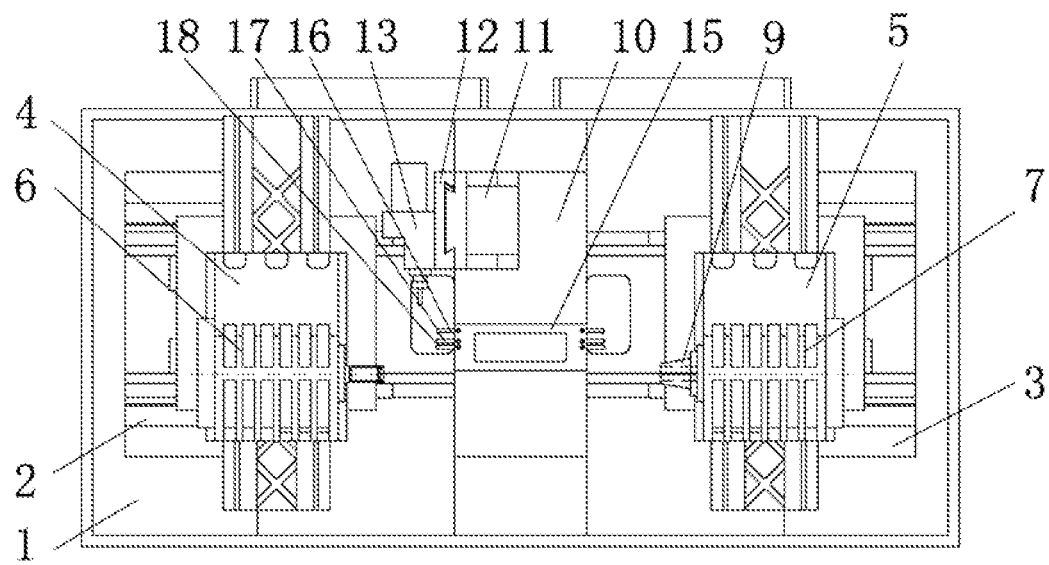
FIG. 2 is a schematic diagram of a top view structure of multi-purpose precision machine tool according to an embodiment of the present disclosure.

In this specific embodiment, as shown in FIGS. 1-2, the first workpiece fixing mechanism includes a first transverse guide rail 2, a first longitudinal sliding table 4, a first horizontal spindle power head 6 and an internally expanding clamp 8; the first transverse guide rail 2 is fixedly provided on the machine tool body 1, the first longitudinal sliding table 4 is slidably provided on the first transverse guide rail 2, the first horizontal spindle power head 6 is provided on the first longitudinal sliding table 4, and the internally expanding clamp 8 is provided on a power output end of the first horizontal spindle power head 6.

The second workpiece fixing mechanism includes a second transverse guide rail 3, a second longitudinal sliding table 5, a second horizontal spindle power head 7 and a soft-jaw chuck 9; the second transverse guide rail 3 is fixedly provided on the machine tool body 1, the second longitudinal sliding table 5 is slidably provided on the second transverse guide rail 3, the second horizontal spindle power head 7 is provided on the second longitudinal sliding table 5, and the soft-jaw chuck 9 is provided on a power output end of the second horizontal spindle power head 7.

The tool mechanism includes a platform 10, a bracket 11, a sliding table 12, a vertically combined power head for drilling and milling 13 and a tool holder 15; the platform 10 is fixedly provided in the middle section of the machine tool body 1, the bracket 11 is provided on the platform 10, the sliding table 12 is provided on the bracket 11, the vertically combined power head for drilling and milling 13 is slidably provided on the sliding table 12, and the tool holder 15 is provided on the platform 10.

Figure 3:
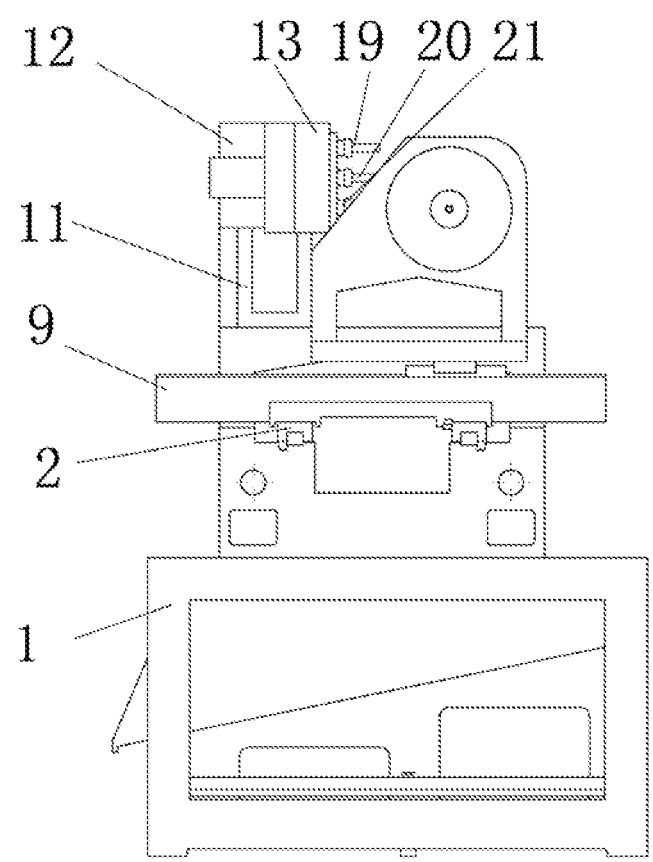
FIG. 3 is a schematic diagram of a left view structure of the multi-purpose precision machine tool according to an embodiment of the present disclosure.
Figure 4:
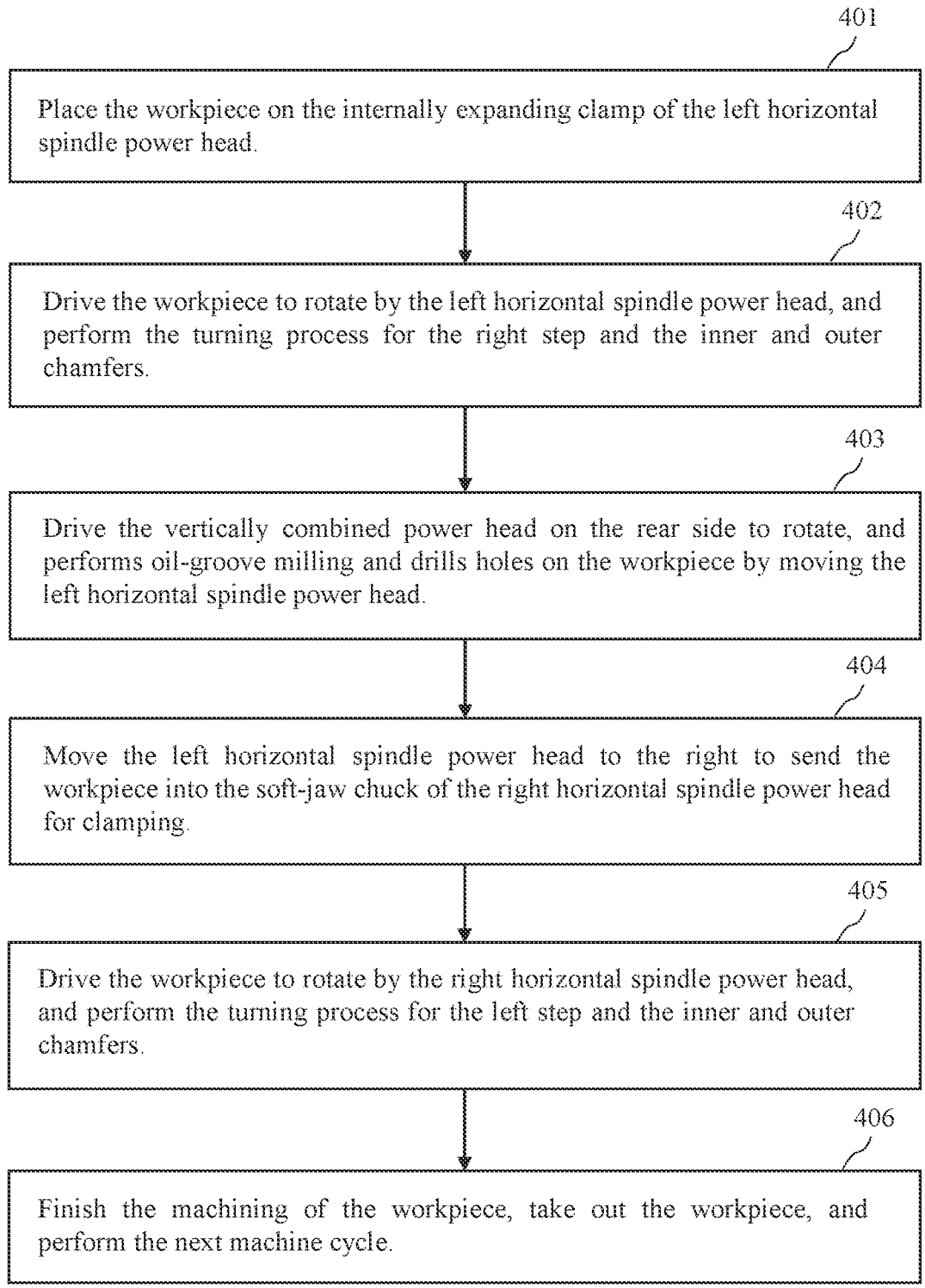
FIG. 4 is a machining process diagram of the multi-purpose precision machine tool according to an embodiment of the present disclosure.

As shown in FIG. 2, a step-turning cutter 16, a surface-outer-corner-turning cutter 17 and an inner-chamfer-turning cutter 18 are installed on the tool holder 15. As shown in FIG. 3, the vertically combined power head for drilling and milling 13 is provided with an oil-groove milling cutter 19, a first drill bit 20 and a second drill bit 21. As shown in FIG. 4, a machining process diagram of the multi-purpose precision machine tool according to an embodiment of the present disclosure is as follows, in step 401, the workpiece is placed on the internally expanding clamp of the left horizontal spindle power head; in step 402, the workpiece is driven to rotate by the left horizontal spindle power head, and the turning process for the right step and the inner and outer chamfers is performed; in step 403, the vertically combined power head on the rear side is driven to rotate, and oil-groove milling and drills holes on the workpiece are performed by moving the left horizontal spindle power head; in step 404, the left horizontal spindle power head is moved to the right to send the workpiece into the soft-jaw chuck of the right horizontal spindle power head for clamping; in step 405, the workpiece is driven to rotate by the right horizontal spindle power head and the turning process for the left step and the inner and outer chamfers is performed; in step 406, the machining of the workpiece is finished, the workpiece is taken out, and the next machining cycle is performed.

Taking the processing of cylindrical tube-shaped parts as an example, one end of the workpiece 14 is fixed by the internally expanding clamp 8. The first horizontal spindle power head 6 drives the workpiece 14 to rotate. The step and the inner and outer chamfers of the other end of the workpiece 14 are performed the turning process. The vertically combined power head on the rear side rotates. Oil-groove milling is performed and holes are drilled on the workpiece 14 by moving the first horizontal spindle power head 6. The first horizontal spindle power head 6 moves to the right to send the workpiece 14 into the soft-jaw chuck 9 for clamping. The second horizontal spindle power head 7 drives the workpiece 14 to rotate. The step and the inner and outer chamfers of the one end of the workpiece 14 are performed the turning process, the machining of the workpiece 14 is finished, the workpiece 14 is taken out, and thus the next machining cycle is performed.

Specific embodiments are used in this specification for illustration of the principles and implementations of the present disclosure. The description of the above embodiments is merely used to help understand the method and core concept of the present disclosure. In addition, those of ordinary skill in the art may make modifications to the specific implementations and application scope in accordance with the concept of the present disclosure. In conclusion, the content of this specification should not be construed as a limitation to the present disclosure.

What is claimed is:

1. A multi-purpose precision machine tool, comprising a machine tool body, a first workpiece fixing mechanism, a second workpiece fixing mechanism and a tool mechanism, wherein the first workpiece fixing mechanism and the second workpiece fixing mechanism are provided on two distal ends of a top of the machine tool body, respectively; and the tool mechanism is provided in a middle section of the machine tool body; the first workpiece fixing mechanism comprises a first transverse guide rail, a first longitudinal sliding table, a first horizontal spindle power head and a first clamp; the first transverse guide rail is fixedly provided on the machine tool body, the first longitudinal sliding table is slidably provided on the first transverse guide rail, the first horizontal spindle power head is provided on the first longitudinal sliding table, and the first clamp is provided on a power output end of the first horizontal spindle power head; the second workpiece fixing mechanism comprises a second transverse guide rail, a second longitudinal sliding table, a second horizontal spindle power head and a second clamp; the second transverse guide rail is fixedly provided on the machine tool body, the second longitudinal sliding table is slidably provided on the second transverse guide rail, the second horizontal spindle power head is provided on the second longitudinal sliding table, and the second clamp is provided on a power output end of the second horizontal spindle power head; the tool mechanism comprises a platform, a bracket, a sliding table, a tool power head and a tool holder; the platform is fixedly provided in a middle section of the machine tool body, the bracket is provided on the platform, the sliding table is provided on the bracket, the tool power head is slidably provided on the sliding table, and the tool holder is provided on the platform.

2. The multi-purpose precision machine tool according to claim 1, wherein the first clamp is an internally expanding clamp.

3. The multi-purpose precision machine tool according to claim 1, wherein the second clamp is a soft-jaw chuck.

4. The multi-purpose precision machine tool according to claim 1, wherein the tool power head is a vertically combined power head for drilling and milling.

5. The multi-purpose precision machine tool according to claim 4, wherein the tool power head is provided with an oil-groove milling cutter and a plurality of drill bits.

6. The multi-purpose precision machine tool according to claim 4, wherein a step-turning cutter, a surface-outer-corner-turning cutter and an inner-chamfer-turning cutter are installed on the tool holder.

* * * * *